US005326484A

United States Patent [19]

Nakashima et al.

[11] Patent Number: 5,326,484

[45] Date of Patent: Jul. 5, 1994

[54] MONODISPERSE SINGLE AND DOUBLE EMULSIONS AND METHOD OF PRODUCING SAME

[75] Inventors: Tadao Nakashima; Masataka Shimizu; Masato Kukizaki, all of Miyazaki, Japan

[73] Assignee: Miyazaki-Ken, Japan

[21] Appl. No.: 906,282

[22] Filed: Jun. 29, 1992

[51] Int. Cl.[5] .................. B01J 13/00

[52] U.S. Cl. .................. 252/314; 252/308; 252/309; 252/312; 366/340; 366/348

[58] Field of Search .................. 252/308, 309, 312, 314; 366/340, 348

[56] References Cited

U.S. PATENT DOCUMENTS

| | | | |
|---|---|---|---|
| 1,330,174 | 2/1920 | De Cew | 252/314 |
| 3,823,091 | 7/1974 | Samejima et al. | 252/312 |
| 4,013,475 | 3/1977 | Liebowitz et al. | 252/309 X |
| 4,201,691 | 5/1980 | Asher et al. | 252/314 |
| 4,369,123 | 1/1983 | Selwitz et al. | 252/312 |
| 4,383,767 | 5/1983 | Jido | 366/348 X |
| 4,621,023 | 11/1986 | Redziniak et al. | 252/314 X |
| 4,657,875 | 4/1987 | Nakashima et al. | 501/39 |
| 4,804,495 | 2/1989 | Bouchez et al. | 252/312 |
| 4,966,779 | 10/1990 | Kirk | 252/312 X |

OTHER PUBLICATIONS

Rosen, Milton, J., *Surfactants and Interfacial Phenomena,* (John Wiley & Sons, New York, 1978), pp. 184–186.

*Primary Examiner*—Richard D. Lovering
*Attorney, Agent, or Firm*—Larson and Taylor

[57] ABSTRACT

The invention provides monodisperse single emulsions which have a mean emulsion particle size within the range of 0.3 to 40 μm and are substantially free of emulsion particles having a particle size smaller than 50% of the mean particle size, double emulsions which have a mean emulsion particle size within the range of 0.3 to 40 μm and whose internal phase concentration is controlled substantially uniformly within the range of 1% to 70%, and methods of producing these emulsions.

5 Claims, 15 Drawing Sheets (b)

(a)

MONODISPERSE SINGLE AND DOUBLE EMULSIONS AND METHOD OF PRODUCING SAME

TECHNICAL FIELD

This invention relates to monodisperse single and double emulsions and a method of producing the same.

In the present specification, "%" means "% by volume", unless otherwise specified.

BACKGROUND ART

Heretofore mechanical means have been used in the production of single emulsions of the o/w (oil-in-water) type and of the w/o (water-in-oil) type, among others. More specifically, emulsions are generally produced by adding an emulsifying agent, such as a surfactant, and a liquid to be dispersed to a continuous phase liquid and stirring or frictionally mixing the resulting mixture by some mechanical means, such as a stirrer, homogenizer or colloid mill, to thereby comminute the dispersed phase. Further, the method of emulsification which comprises irradiating mixed liquids obtained in the above manner with ultrasonic waves to cause cavitation is also used.

However, the use of such mechanical means poses a problem that dispersed phase particles in the emulsion prepared (hereinafter sometimes referred to as emulsion particles) are considerably ununiform in size, so that the emulsion is poor in stability. In particular, when the dispersed phase concentration is high, a large amount of surfactant will be required for the improvement of emulsion stability.

Furthermore, it is difficult, by these known emulsion preparation methods, to suitably adjust the emulsion particle size depending on the intended use. Thus, for instance, while strict emulsion particle size control is very important in manufacturing monodisperse polymer microspheres, monodisperse inorganic microspheres and the like from emulsion particles, the prior art methods which use conventional mechanical means can hardly meet such requirement.

On the other hand, two methods are known for the production of double emulsions of the o/w/o or w/o/w type. One is the one-step emulsification method which utilizes phase inversion from w/o type emulsions to o/w type emulsions or from o/w type emulsions to w/o type emulsions and the other is the two-step emulsification method comprising dispersing with stirring a w/o or o/w type emulsion prepared in advance again in a continuous phase to obtain a w/o/w or o/w/o type emulsion. However, these methods have problems; for example, the yield of double emulsion particles may be low, and disruption of emulsion particles may occur, allowing a substance or substances added to flow out from the internal phase. Further, it is very difficult to obtain, by these methods, double emulsion particles size-controlled in the micron to submicron order, which are most important from the practical viewpoint.

DISCLOSURE OF THE INVENTION

In view of the above problems encountered in the prior art, the present inventors made intensive investigations. As a result, they have already completed a novel method of producing emulsions which uses a microporous membrane, and relevant patent applications have been filed (Japanese Patent Application No. 63-244988 and U.S. patent application Ser. No. 07/412,518, now abandoned).

As a result of further investigations, the present inventors have now completed a novel method of producing monodisperse single emulsions and double emulsions, which method can make emulsion particles more uniform in size. It has also been found that said method can give double emulsion particles in high yield and, in addition, can effectively prevent the loss of a substance or substances added from the internal phase as resulting from disruption of emulsion particles.

Thus the invention provides the following emulsions and production methods therefor:

1. A monodisperse single emulsion characterized in that (a) the mean particle size of emulsion particles is within the range of 0.3 to 40 μm, (b) said emulsion is substantially free of particles having a size smaller than 50% of the mean particle size, and (c) said emulsion is an emulsion produced by introducing under pressure a dispersed phase-forming liquid into a continuous phase-forming liquid through a surface-treated porous glass membrane having pores uniform in size at a pressure 1 to 10 times the critical pressure.

2. A monodisperse emulsion as described in above item 1 which is an o/w type emulsion.
3. A monodisperse emulsion as described in above item 1 which is a w/o type emulsion.
4. A double emulsion characterized in that (a) the mean particle size of emulsion particles is within the range of 0.3 to 40 μm, (b) the internal phase concentration is controlled at a substantially constant level within the range of 1 to 70%, and (c) said emulsion is an emulsion produced by introducing under pressure a single emulsion into a continuous phase-forming liquid through a surface-treated porous glass membrane having pores uniform in size at a pressure 1 to 10 times the critical pressure.

5. A double emulsion as described in above item 4 which is a w/o/w type emulsion.
6. A double emulsion as described in above item 4 which is an o/w/o type emulsion.
7. A method of producing an o/w type monodisperse single emulsion which comprises introducing under pressure a dispersed phase-forming oily liquid into a continuous phase-forming aqueous liquid containing a cationic surfactant through a hydrophilic porous glass membrane positively charged by surface treatment and having pores uniform in size at a pressure 1 to 10 times the critical pressure.
8. A method of producing an o/w type monodisperse single emulsion which comprises introducing under pressure a dispersed phase-forming oily liquid into a continuous phase-forming aqueous liquid containing an anionic surfactant and/or a nonionic surfactant through a hydrophilic porous glass membrane negatively charged by surface treatment and having pores uniform in size at a pressure 1 to 10 times the critical pressure.
9. A method of producing an o/w type monodisperse single emulsion which comprises introducing under pressure a dispersed phase-forming oily liquid containing an oil-soluble surfactant into a continuous phase-forming aqueous liquid containing a cationic surfactant through a hydrophilic porous glass membrane positively charged by surface treatment and having pores uniform in size at a pressure 1 to 10 times the critical pressure.

10. A method of producing an o/w type monodisperse single emulsion which comprises introducing under pressure a dispersed phase-forming oily liquid containing an oil-soluble surfactant into a continuous phase-forming aqueous liquid containing an anionic surfactant and/or a nonionic surfactant and/or a dispersion stabilizer through a hydrophilic porous glass membrane negatively charged by surface treatment and having pores uniform in size at a pressure 1 to 10 times the critical pressure.

11. A method of producing a w/o type monodisperse single emulsion which comprises introducing under pressure a dispersed phase-forming aqueous liquid into a continuous phase-forming oily liquid containing an oil-soluble surfactant through a porous glass membrane rendered hydrophobic by surface treatment and having pores uniform in size at a pressure 1 to 10 times the critical pressure.

The term "monodisperse emulsion" as used herein means any emulsion showing a coefficient of particle size dispersion, $\epsilon$, of not more than 0.5, preferably not more than 0.3. Said coefficient $\epsilon$ is defined by the following equation.

$$\epsilon=({}^{90}D_p-{}^{10}D_p)/{}^{50}D_p \quad (1)$$

where ${}^{10}D_p$, ${}^{50}D_p$ and ${}^{90}D_p$ are the particle sizes when the cumulative frequencies estimated from a relative cumulative particle size distribution curve for the emulsion are 10%, 50% and 90%, respectively. The case where $\epsilon=0$ means an ideal state in which emulsion particles show no particle size scattering at all.

The emulsions according to the invention show an $\epsilon$ value of about 0.3 or less (when particle size measurement is made using a centrifugal sedimentation type particle size distribution measuring apparatus) or about 0.55 to 0.6 or less (when particle size measurement is made using a laser diffraction type particle size distribution measuring apparatus). These values are very small as compared with the $\epsilon$ values for the emulsions produced by the conventional methods mentioned above ($\epsilon=0.5$ or higher when measurement is made using a centrifugal sedimentation type particle size distribution measuring apparatus; $\epsilon=1.0$ or higher when measurement is made using a laser diffraction type particle size distribution measuring apparatus), showing the superiority of the emulsions according to the invention in the uniformity in emulsion particle size. More specifically, the content, in the emulsions of the invention, of smaller particles having a size less than 50% of the mean particle size is only about 1% or less, hence said emulsions can be said to be substantially free of smaller particles having a size less than 50% of the mean particle size.

The term "critical pressure" as used herein means a minimum pressure required for the introduction of a dispersed phase-forming liquid into a continuous phase-forming liquid through a porous glass membrane. Such critical pressure Pc (kPa) is defined by the following equation.

$$P_c=4\gamma_{ow}\cos\theta/D_m \quad (2)$$

where $\gamma_{ow}$=interfacial tension (mN/m), $\theta$=contact angle (rad), and $D_m$=mean pore size (μm) of the porous glass membrane.

BRIEF DESCRIPTION OF THE DRAWINGS

In FIG. 1, the illustrations (a), (b) and (c) schematically show the mechanism of emulsion particle formation by the method of the invention in relation to the critical pressure. The porous glass membrane 1 has a glass skeleton surface 2 more readily wettable with the continuous phase liquid 5 than with the dispersed phase-forming liquid 4. This wettability can be adjusted by physical surface treatment or chemical surface-modifying treatment, which is to be mentioned later herein. Under the circumstances shown in FIG. 1, if $\Delta P$ (=dispersed phase-forming liquid side pressure - continuous phase side pressure)$<P_c$ even when the dispersed phase-forming liquid side pressure is greater than the continuous phase side pressure, namely $\Delta P>0$, the dispersed phase-forming liquid 4 will not invade into the pores 3 of the porous glass membrane but the pores 3 will remain filled with the continuous phase liquid 5, as shown in FIG. 1 (*a*). If $\Delta P=P_c$, the dispersed phase-forming liquid 4 begins to invade into the pores 3 of the porous glass membrane, as shown in FIG. 1 (*b*), and, when $\Delta P>P_c$, emulsion particles 6 of the dispersed phase-forming liquid 4 are formed in the continuous phase liquid, as shown in FIG. 1 (*c*). In accordance with the invention, the dispersed phase-forming liquid is introduced into the continuous phase liquid by causing it to pass through pores of a porous glass membrane under pressure conditions such that $\Delta P>P_c$ and the pressure is 1 to 10 times (preferably 1 to 5 times) the critical pressure. When the pressure exerted on the dispersed phase-forming liquid is below 1 time the critical pressure, it is of course impossible to produce any emulsion. When, conversely, said pressure is more than 10 times the critical pressure, the porous glass will be easily wetted with the dispersed phase-forming liquid so that monodisperse emulsions can hardly be obtained stably.

The "porous glass membrane" to be used in the invention can be produced by utilizing the phenomenon of micro phase separation upon heat treatment of glass. As specific examples of such porous glass membrane, there may be mentioned $CaO—B_2O_3—SiO_2—Al_2O_3$-based porous glass disclosed in Examined Japanese Patent Publication No. 62-25618, and $CaO—B_2O_3—SiO_2—Al_2O_3—Na_2O$-based porous glass and $CaO—B_2O_3—SiO_2—Al_2O_3—Na_2O—MgO$-based porous glass disclosed in Examined Japanese Patent Publication No. 63-66777 and U.S. Pat. No. 4,657,875. These porous glass species are characterized in that the pore size is controlled in a very narrow range and the pores are cylindrical in longitudinal section. By using porous glass membranes having such characteristics, emulsions containing emulsion particles with a specific controlled particle size range corresponding to the pore size can be produced. The thickness of the glass membrane is not critical but, considering its strength, the resistance in emulsion production and other factors, it is preferably about 0.4 to 2 mm.

While, generally, such porous glass membrane can be designed to have pores uniform in size within the range of 1 nm to 10 μm, the porous glass membrane to be used in the practice of the invention has a mean pore size within the range of 0.1 to 5 μm.

Figure 1:
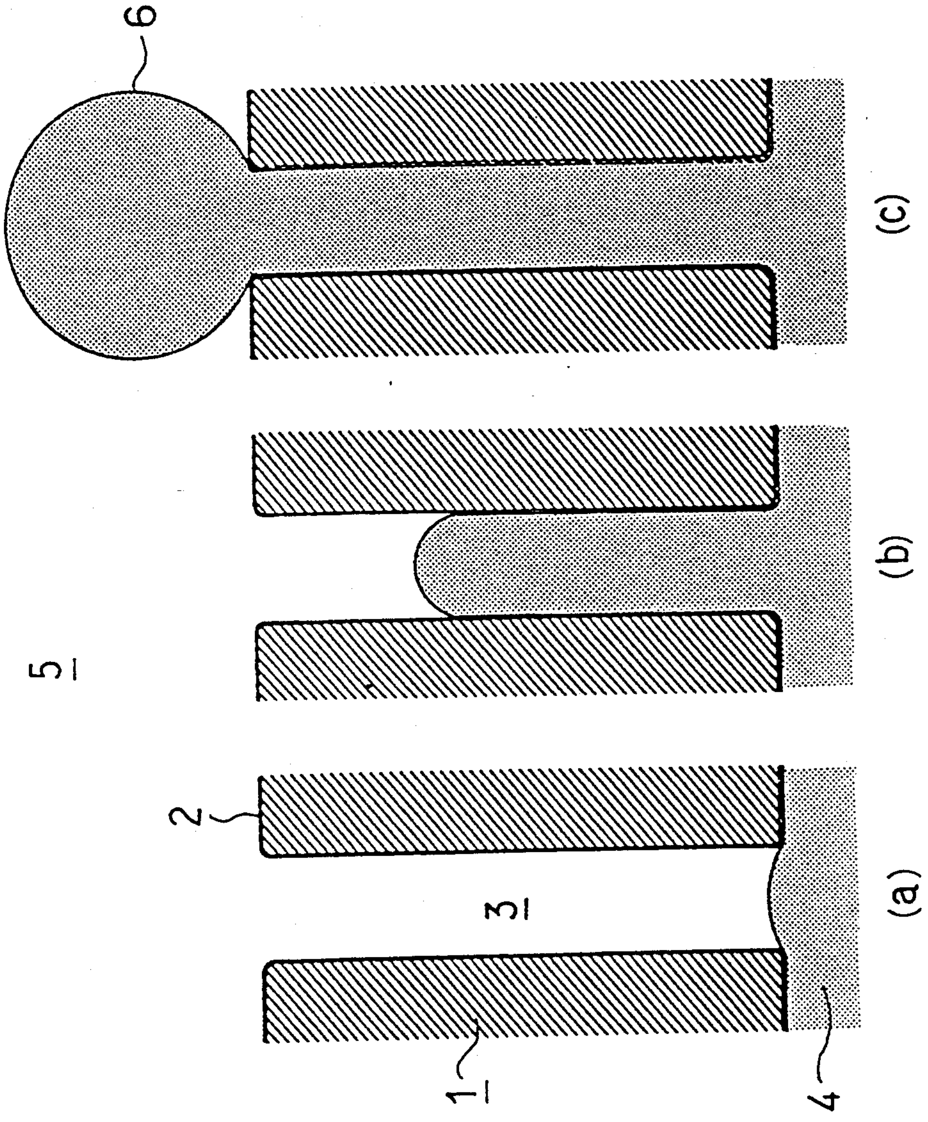
FIG. 1 schematically illustrates the mechanism of emulsion particle formation by the method of the invention.
Figure 2:
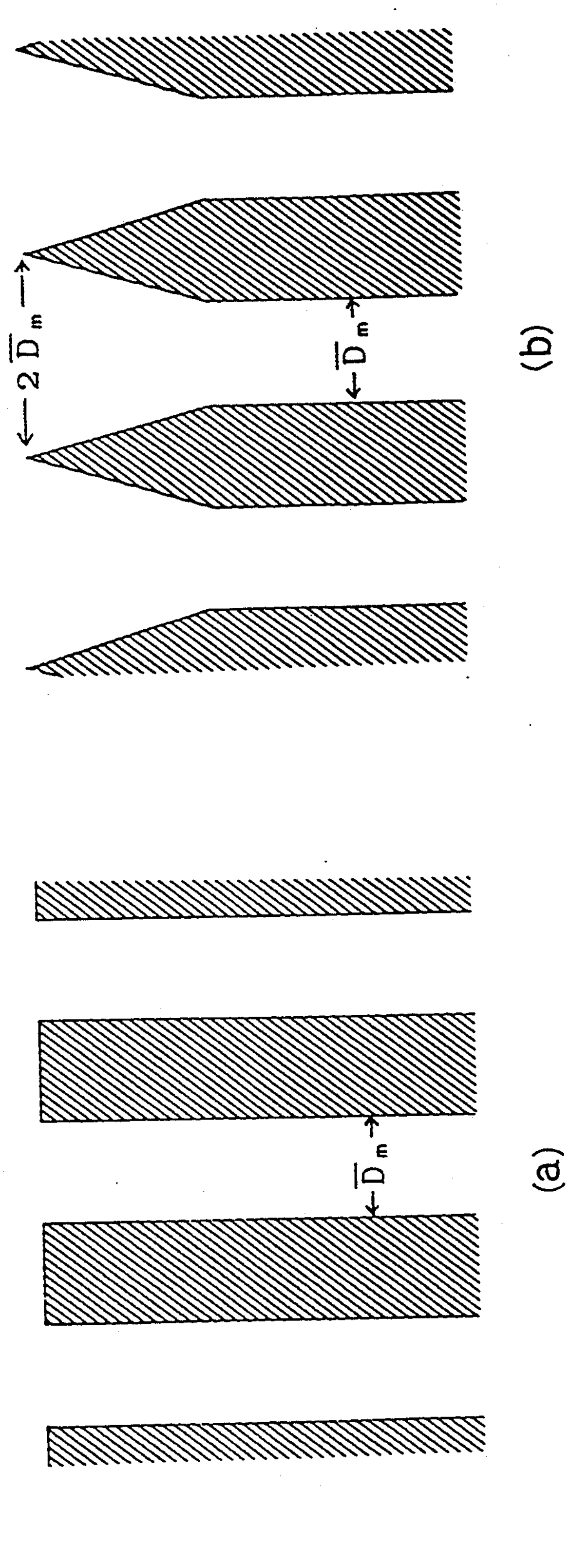
FIG. 2 shows pores of porous glass membranes used in the invention.

When, as shown in FIG. 2 (*a*), the pores of the porous glass membrane are cylindrical, the emulsion particles produced under the above-mentioned pressure conditions will have a mean particle size about 3.25 times the mean pore size. When, as shown in FIG. 2 (*b*), the pore outlet portion of the porous glass membrane, which is to come into contact with the continuous phase-forming liquid, has a funnel-like shape so that the pore outlet diameter is twice the pore diameter, emulsion particles having a particle size about 7 to 8 times the mean pore size can be obtained by using such porous glass membrane and proceeding under the pressure conditions mentioned above. Therefore, by properly using either a porous glass membrane having cylindrical pores or a porous glass membrane having funnel-shaped pores, it is possible to produce emulsions having a mean particle size of 0.3 to 40 μm, which is about 3 to 8 times the pore size.

It has been found that the emulsions produced by the method of the invention show strict correspondence between the pore size distribution in the porous glass membrane used and the particle size distribution of emulsion particles in said emulsions. Thus, when a membrane with a sharp pore size distribution is used, emulsions with a sharp particle size distribution can be obtained whereas the use of a membrane with a broad pore size distribution results in emulsions with a broad particle size distribution.

The porous glass membrane to be used in accordance with the invention is hydrophilic by nature owing to the polar groups (—SiOH, —OH, etc.) occurring on the pore surface and is negatively charged in water, though weakly. In the practice of the invention, the porous glass membrane is surface-modified by various treatment methods. For example, introduction of an acid residue, such as a sulfo group, into the surface layer of the porous glass membrane can give a membrane having a stronger negative charge. As the method of sulfo group introduction, there may be mentioned, for example, treatment with benzyltrichlorosilane and $SO_3$, treatment with benzyldimethylchlorosilane and $SO_3$, and treatment with 1,3-propanesultone. When an amino group or the like is introduced into the surface of the porous glass membrane, said membrane can be rendered positively charged. As the method of amino group introduction, there may be mentioned, among others, treatment of a hydrophilic porous glass membrane with 2-aminoethylaminopropyltriethoxysilane, γ-aminopropyltriethoxysilane, N-(2-amino)-3-aminopropylmethyldimethoxysilane, N-trimethoxysilylpropyl-N,N,N-trimethylammonium chloride or the like. Furthermore, the surface of the porous glass membrane can be made hydrophobic by introducing a hydrocarbon group thereinto using various reagents or providing it with an organic coating composition. Unless the uniform porous structure of the porous glass membrane itself is damaged, any surface modification method may be employed without any particular limitation.

For the production of o/w type emulsions or w/o/w type emulsions according to the invention, the porous glass membrane is preferably used in a negatively charged state.

More specifically, the method of the present invention is carried out generally in the following manner.

A. Production of o/w type single emulsions

When the surface of the hydrophilic porous glass membrane is negatively charged, an anionic surfactant and/or a nonionic surfactant and/or a dispersing agent is dissolved in the aqueous continuous phase liquid.

Figure 3:
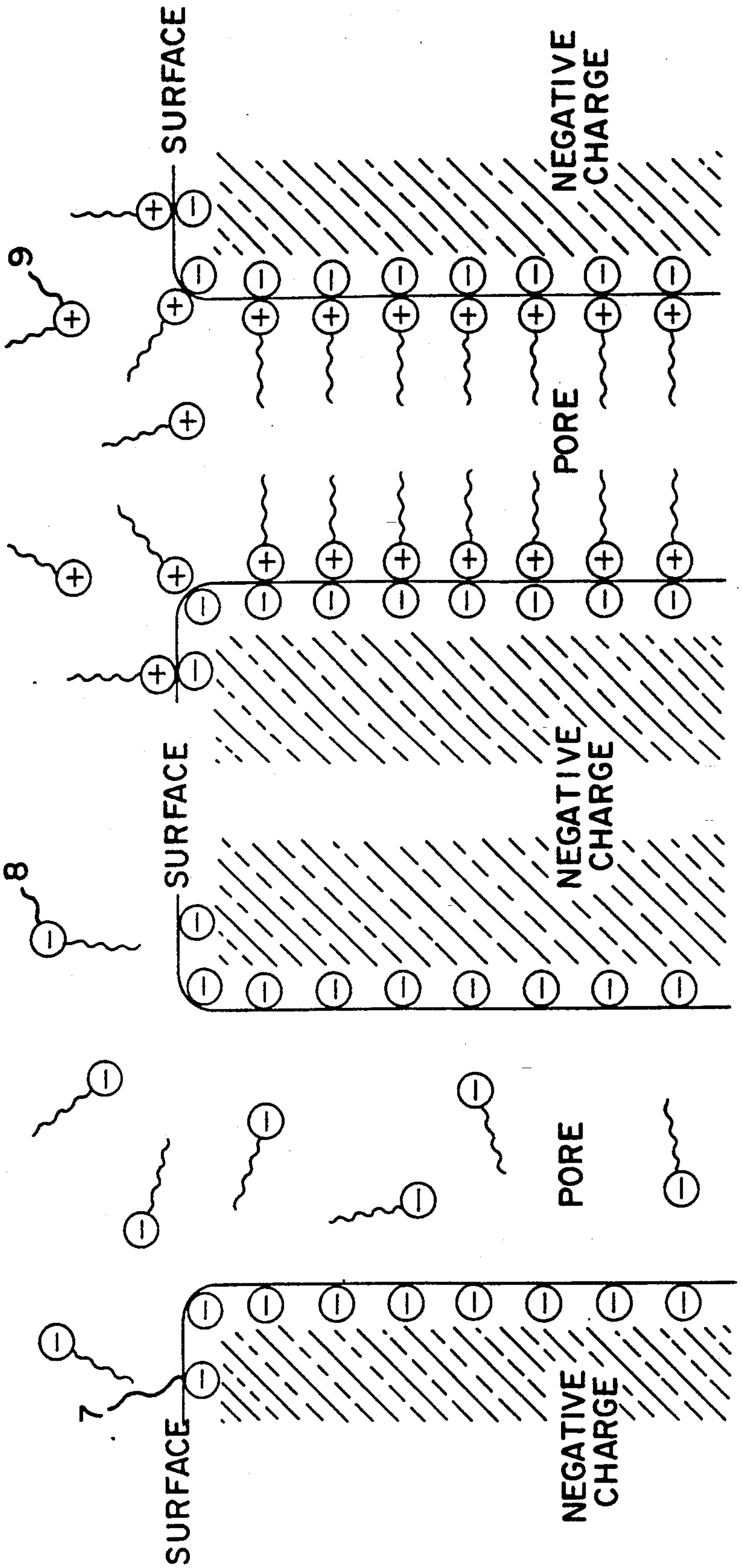
FIG. 3 schematically illustrates the behavior of surfactant molecules relative to the pore surface of a hydrophilic porous glass membrane.

FIG. 3 schematically illustrates the behavior of surfactant molecules relative to the pore surface of a hydrophilic porous glass membrane. When, for example, as shown in FIG. 3 (*a*), a porous glass membrane having a negatively charged glass surface 7 is used and an anionic surfactant (8) is dissolved in the continuous phase liquid (aqueous phase), the glass surface 7 will not be wetted with the dispersed phase-forming liquid (oily phase) invading into the pores, whereby monodisperse o/w type single emulsions can be produced.

On the contrary, when a cationic surfactant 9 is dissolved in the continuous phase liquid (aqueous phase), as shown in FIG. 3 (*b*), the cationic surfactant 9 is electrostatically adsorbed on the negatively charged glass surface 7 and the hydrophobic group of the cationic surfactant 9 is oriented toward the liquid phase side. As a result, the glass surface exhibits hydrophobicity and is wetted with the dispersed phase-forming oily liquid, so that any monodisperse emulsion cannot be produced.

The method of the invention makes it possible to produce monodisperse emulsions even when the surfactant concentration is as low as about one thirtieth to one tenth the critical micelle concentration. This is because the surfactant is required only in small amounts for the stabilization of emulsion particles since the emulsion particles are uniform in size.

The anionic surfactant, nonionic surfactant and dispersing agent to be added to the aqueous continuous phase liquid are not limited to any particular species if they are soluble in the aqueous continuous phase liquid. As examples, the following may be mentioned.

* Artionic surfactants . . . carboxylic acid salts such as sodium oleate, sulfonic acid salts such as sodium dodecylbenzenesulfonate, sulfuric ester salts such as sodium dodecyl sulfate, etc.

* Nonionic surfactants . . . polyethylene oxide condensates such as polyoxyethylenesorbitan monolaurate, sugar fatty acid esters, etc.

* Dispersing agents . . . macromolecular dispersing agents such as polyvinyl alcohol.

In reducing the particle size dispersion coefficient $\epsilon$ mentioned above, it is effective in some cases to dissolve the surfactant not only in the continuous phase liquid (aqueous phase) but also in the dispersed phase-forming liquid (oily phase). In that case, the oil-soluble surfactant is added to the oily phase generally in an amount of about 0.1 to 10% by weight, preferably about 0.5 to 2% by weight. When the amount of the oil-soluble surfactant dissolved is less than 0.1% by weight, the improving effect cannot be produced to a satisfactory extent. Conversely, when said amount exceeds 10% by weight, unfavorable phenomena, such as solubilization of water in the oily phase and liquid crystal formation, may be observed. The oil-soluble surfactant to be added to the dispersed phase-forming oily liquid is not particularly limited in kind but may include the following, for instance.

* Sorbitan esters, oil-soluble polyethylene oxide condensates, glycerol esters such as monoglycerol fatty acid esters, etc.

Even when an oil-soluble surfactant is added to the dispersed phase-forming oily liquid, an anionic surfactant and/or a nonionic surfactant and/or a dispersing agent should be added to the continuous phase liquid (aqueous phase) as well.

When the hydrophilic porous glass membrane is positively charged as a result of surface treatment, monodisperse emulsions can be produced efficiently by using a cationic surfactant dissolved in the continuous phase liquid (aqueous phase) and thus preventing the glass surface from being wetted with the dispersed phase-forming liquid (oily liquid).

The cationic surfactant is not limited to any particular species if it is soluble in the aqueous continuous phase liquid. Thus it includes the following, among others.

* Cationic surfactants . . . ammonium salts such as cetyltrimethylammonium bromide, amine salts such as laurylamine hydrochloride, etc.

B. Production of w/o type single emulsions

In this case, the porous glass membrane is rendered hydrophobic by surface treatment, and the same oil-soluble surfactant as mentioned above is dissolved in the continuous phase liquid (oily phase) in an amount of about 0.1 to 10% by weight, preferably about 0.5 to 2% by weight. The continuous phase-forming liquid is not particularly limited and may include, organic solvents, petroleum-derived oils, and animal and vegetable oils.

A water-soluble substance may be added to the dispersed phase-forming liquid (aqueous phase). The water-soluble substance is not particularly limited and may include inorganic salts, organic salts, saccharides and macromolecular substances. The water-soluble substance is added in an amount within the range of 0.05% by weight based on the dispersed phase-forming liquid to saturation, preferably 0.5% on the same basis to saturation.

C. Production of w/o/w type double emulsions

In this case, double emulsions can be obtained by introducing under pressure a w/o type single emulsion prepared in advance into a continuous phase liquid (aqueous phase) through a hydrophilic porous glass membrane. It is important that the pore size of the porous glass membrane is at least equal to, preferably at least about 1.5 times, the maximum particle size that the single emulsion shows. If the pore size of the porous glass membrane is less than the maximum single emulsion particle size, filtration of single emulsion particles will occur through the porous glass membrane. When the above conditions are satisfied between the pore size of the porous glass membrane and the maximum single emulsion particle size, the single emulsion particles adjusted to a particle concentration of about 1 to 70% pass through the membrane without meeting any resistance within the pores to form a double emulsion. The size of emulsion particles in said double emulsion can be controlled within the range of 0.3 to 40 μm, as in the case of single emulsions.

D. Production of o/w/o type double emulsions

In this case, an o/w type single emulsion prepared in advance is introduced under pressure into a continuous phase liquid (oily phase) through a porous glass membrane rendered hydrophobic by preliminary surface treatment. In this case, too, it is necessary that the same conditions as in the production of w/o/w type double emulsions mentioned above should be satisfied between the pore size of the porous glass membrane and the maximum single emulsion particle size.

Figure 4:
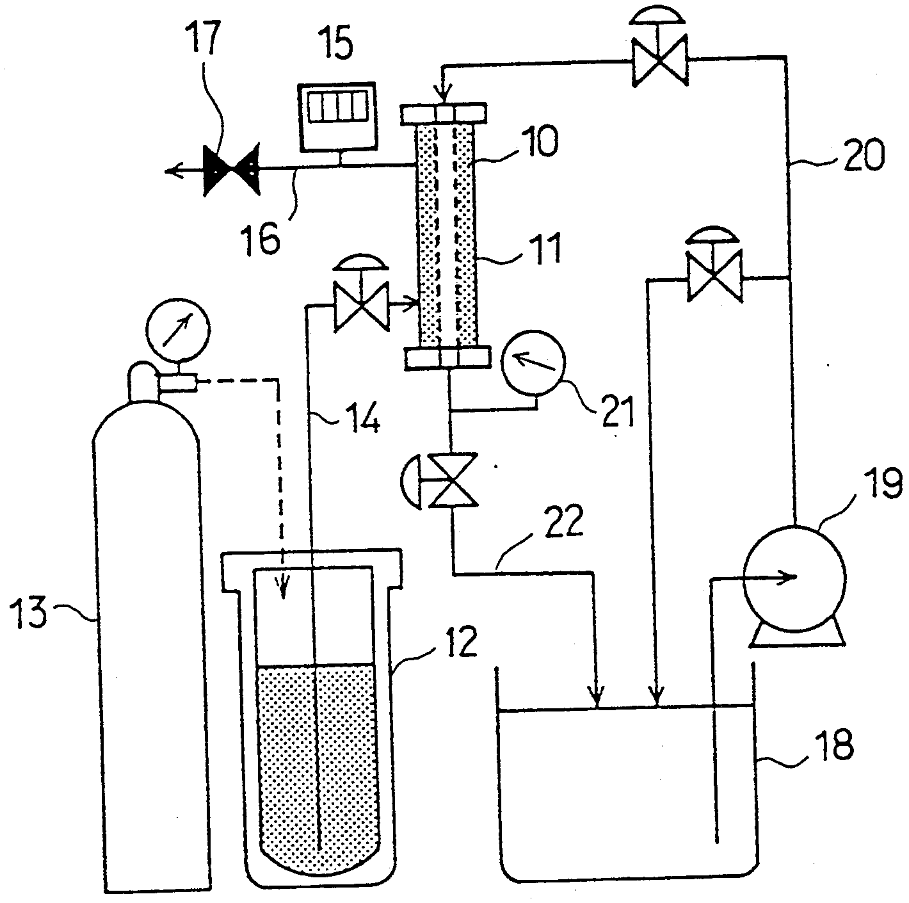
FIG. 4 shows an apparatus for carrying out the method of the invention.

An apparatus for carrying out the method of the invention is shown by way of example in FIG. 4. The construction and operation of this apparatus may be summarized as follows.

A cylindrical porous glass membrane 10 is fixed inside a module 11. A dispersed phase-forming liquid stored in a tank 12 is caused under pressure, namely by high pressure nitrogen gas from a cylinder 13, to fill a line 14, the outer side of the cylindrical porous glass membrane 10 in the module 11, and a line 16 fitted with a pressure gage 15. A valve 17 is then closed, so that a pressure below the critical pressure is applied to the dispersed phase-forming liquid.

On the other hand, a continuous phase-forming liquid is circulated from a tank 18 containing the same through a pump 19, a line 20, the internal side of the cylindrical porous glass membrane 10 in the module 11, and a line 22 fitted with a pressure gage 21, to said tank.

The pressure on the dispersed phase-forming liquid is then increased to a level of or above the critical pressure to thereby cause the dispersed phase-forming liquid to pass through the pores of the porous glass membrane 10 and form emulsion particles. The apparatus is continuingly operated until a desired dispersed phase concentration is attained. Monodisperse single emulsions are prepared in this way.

The apparatus shown in FIG. 4 can be used also for the production of double emulsions. In producing a w/o/w type emulsion, for instance, a w/o type emulsion prepared in advance is charged into the tank 12, while a continuous phase liquid (aqueous phase) is charged into the tank 18. In this state, the same operation as mentioned above is performed to introduce the w/o type emulsion into the continuous phase liquid through the hydrophilic porous glass membrane 10 fixed inside the module 11, to give a w/o/w type emulsion.

Figure 5:
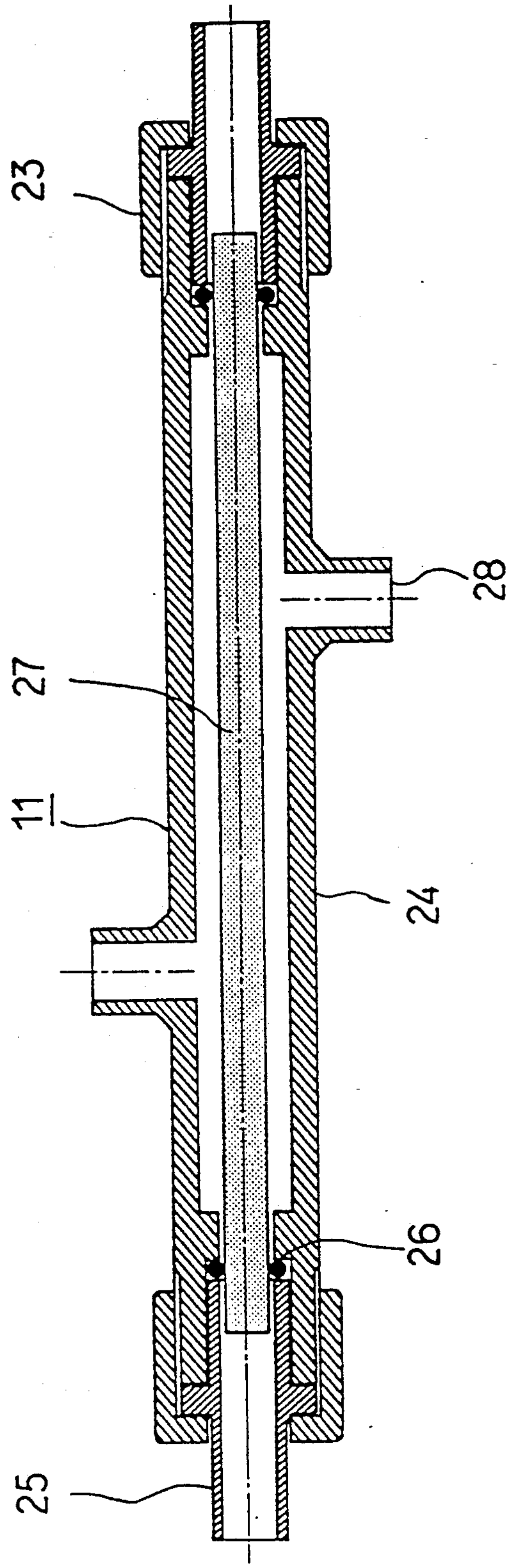
FIG. 5 schematically shows in section an example of the module used in the invention.

An example of the module to be used in the practice of the invention is schematically shown in section in FIG. 5. A cylindrical porous glass membrane 27 alone is shown by appearance, not in section. This module is composed of a tightening cap 23, a housing 24, a spacer 25, an O ring 26 and the cylindrical porous glass membrane 27. For preparing an o/w type emulsion or w/o type emulsion, for instance, using this module, a dispersed phase-forming liquid fed through an inlet 28 is introduced under pressure from the outside of the cylindrical porous glass membrane 27 into a continuous phase liquid flowing in the inside of said membrane.

EFFECTS OF THE INVENTION

In accordance with the present invention, emulsion particles uniform in particle size can be obtained and, in addition, the particle size can be controlled as desired.

The emulsions provided by the invention and comprising particles uniform in size contribute to markedly improve the performance characteristics of various materials produced by using said emulsions.

Further, the emulsions markedly improve the quality of solid particles obtained therefrom.

The fact that emulsions can be prepared by using a simple apparatus and a simple operation procedure with a reduced consumption of energy is very advantageous from the economical viewpoint.

Therefore, more specifically, the invention is very useful in the production of various materials which require emulsification treatment for their production, for example in the production of foods, medicines, cosmetics, pigments, functional plastic particles, functional inorganic material particles, raw materials for fine ceramics and so forth as well as in solvent extraction.

BEST MODES FOR CARRYING OUT THE INVENTION

EXAMPLE 1

Production of o/w type emulsion I

A. Four cylindrical porous glass membranes (250 mm in length × 9 mm in inside diameter × 0.5 mm in thickness) obtained by the method described in Examined Japanese Patent Publication No. 63-66777 (U.S. Pat. No. 4,657,875) were respectively mounted on modules as shown in FIG. 5. The emulsification apparatus shown in FIG. 4 was equipped with these modules and o/w type emulsions were produced.

Kerosene was used as the dispersed phase-forming liquid. The continuous phase liquid used was a deionized water containing sodium dodecyl sulfate (SDS) in a concentration of 6.9 mmol/liter. In preparing emulsions, the dispersed phase-forming liquid was forced into the continuous phase liquid at a pressure ΔP three times the critical pressure $P_c$.

For the four cylindrical porous glass membranes submitted to the experiment, relative cumulative pore size distribution curves were determined using a mercury penetration type porosimeter. The results are shown in FIG. 6.

For the o/w type emulsions obtained, relative cumulative emulsion particle size distribution curves were determined using a centrifugal sedimentation type particle size distribution measuring apparatus. The results are shown in FIG. 6.

Figure 6:
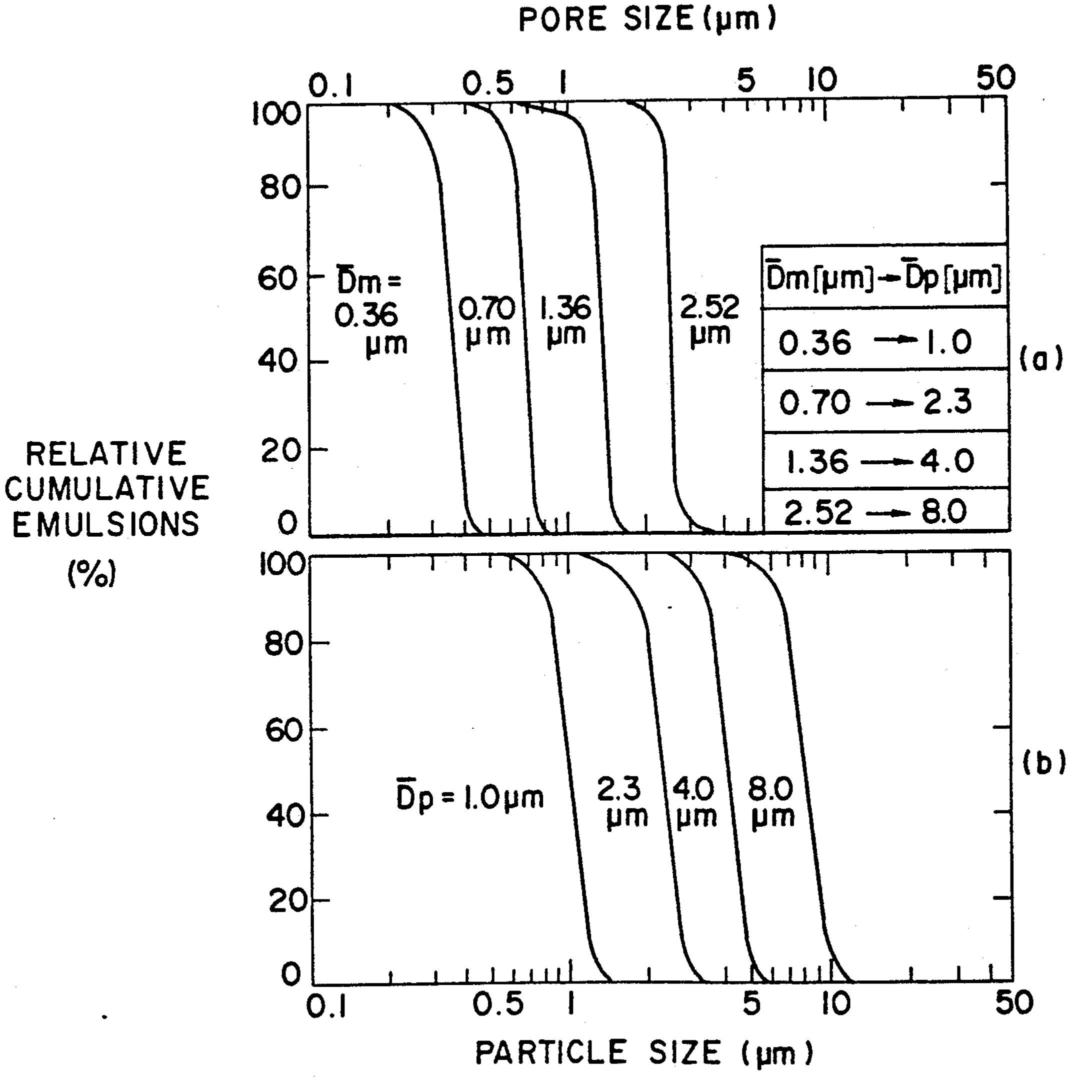
FIG. 6 shows the results for the emulsions obtained in Example 1A.

When FIG. 6 (*a*) is compared with FIG. 6 (*b*), the two kinds of cumulative curve show good correspondence. Thus, the o/w type emulsions produced in the above manner by using porous glass membranes with a mean pore size ($D_m$) of 0.36 μm, 0.70 μm, 1.36 μm, and 2.52 μm have a mean particle size ($D_p$) of 1.0 μm, 2.3 μm, 4.0 μm, and 8.0 μm, respectively, each $D_p$ thus being about three times the corresponding $D_m$.

Figure 7:
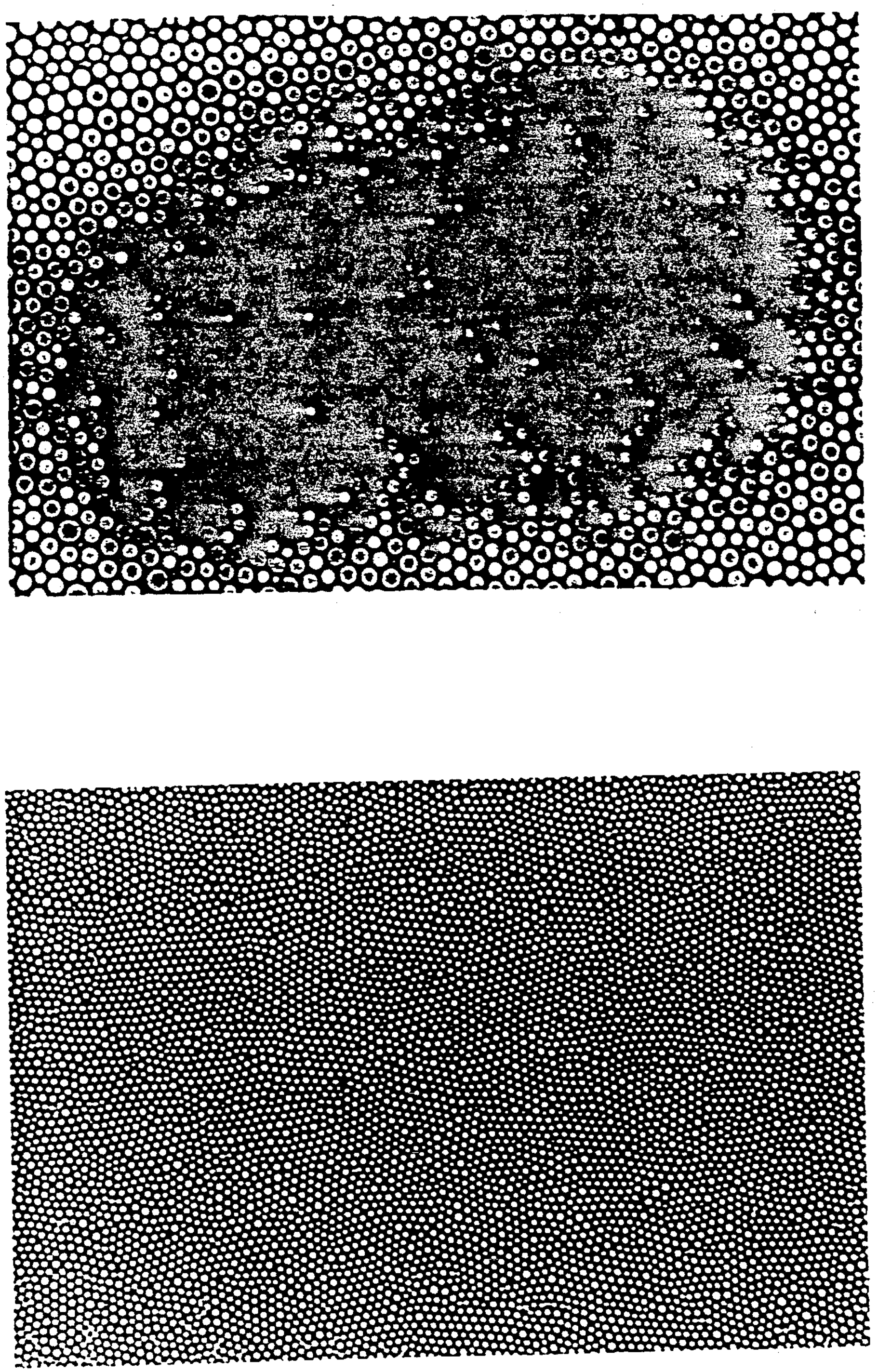
FIG. 7 shows optical photomicrographs of o/w emulsions obtained by the invention.

An optical photomicrograph of an o/w type emulsion obtained under the same conditions as mentioned above using a porous glass membrane having a pore diameter ($D_m$) of 0.52 μm is shown in FIG. 7 (*a*) and an optical photomicrograph of an o/w type emulsion obtained under the same conditions as mentioned above using a porous glass membrane having a pore size ($D_m$) of 1.36 μm is shown in FIG. 7 (*b*). In the figure, the scale corresponds to 10 μm. From FIG. 7 (*a*) and (*b*), it is evident that the emulsions according to the invention are very uniform in particle size and are monodisperse.

The above results clearly indicate that the method of the invention, when carried out using a porous glass membrane sharp in pore size distribution and surface-treated in advance, can give monodisperse emulsions with a sharp particle size distribution.

Figure 8:
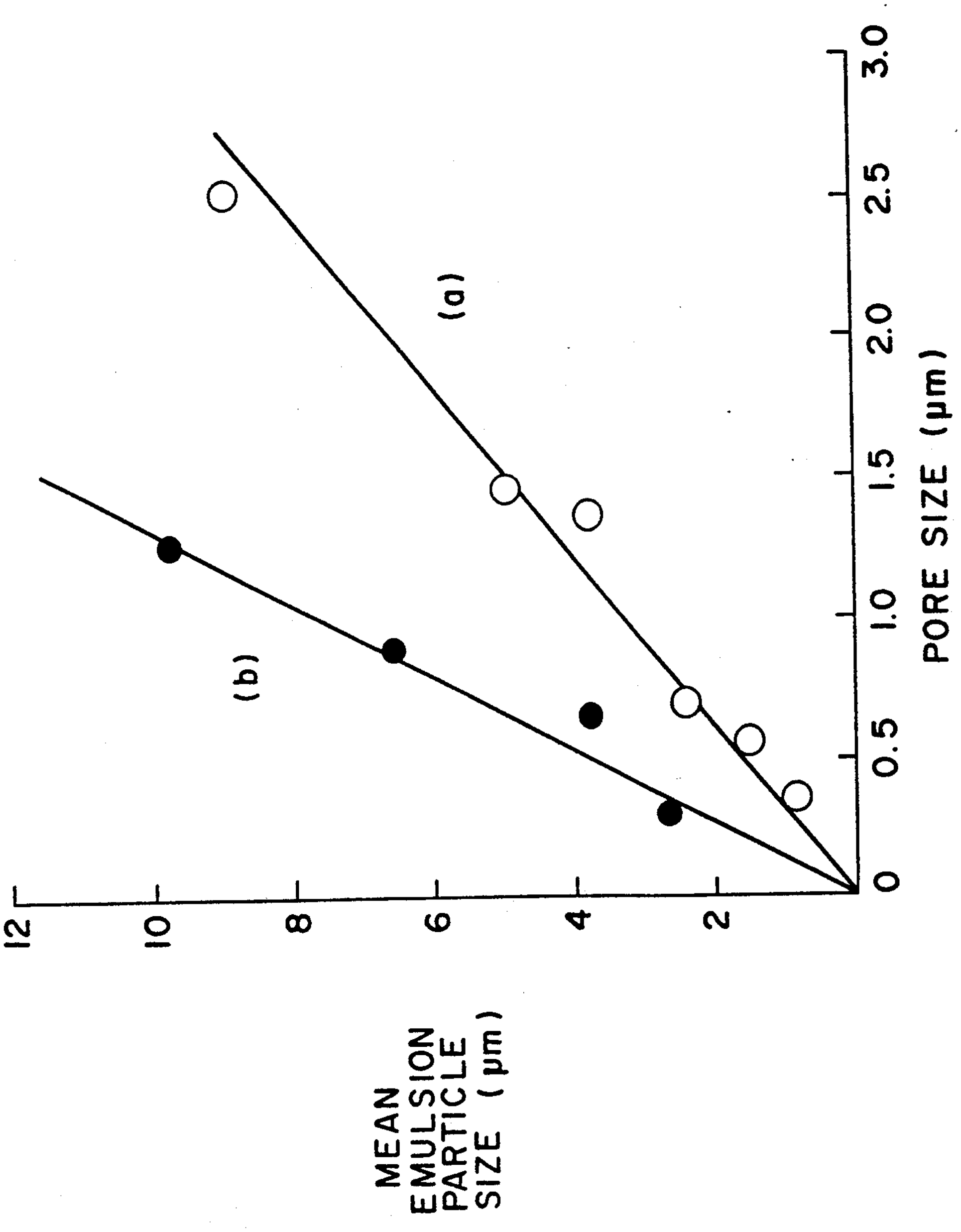
FIG. 8 shows the relation between the membrane pore size determined by using a mercury penetration type porosimeter and the mean particle size of the o/w emulsion obtained.

B. Further, using porous glass membranes having either of the two kinds of pore outlet shape shown in FIGS. 2 (*a*) and (*b*), respectively, o/w type emulsions were produced under the same conditions as mentioned above under A. The relation between the membrane pore size determined by using a mercury penetration type porosimeter and the mean particle size of the o/w type emulsion obtained is shown in FIG. 8. For the emulsion particles obtained by using a porous glass membrane having pore outlets cylindrical in shape as shown in FIG. 2 (*a*), the mean particle size was about three times the mean pore size of the porous glass membrane [straight line (a)] whereas the mean particle size of the emulsion particles obtained by using a porous glass membrane having pore outlets funnel-like in shape as shown in FIG. 2 (*b*) was about 7 times the mean pore size of the porous glass membrane [straight line (b)]. This fact clearly indicates that it is possible to increase the emulsion particle size, while controlling said particle size, by processing for adjustment of the mean pore outlet shape and size.

Figure 9:
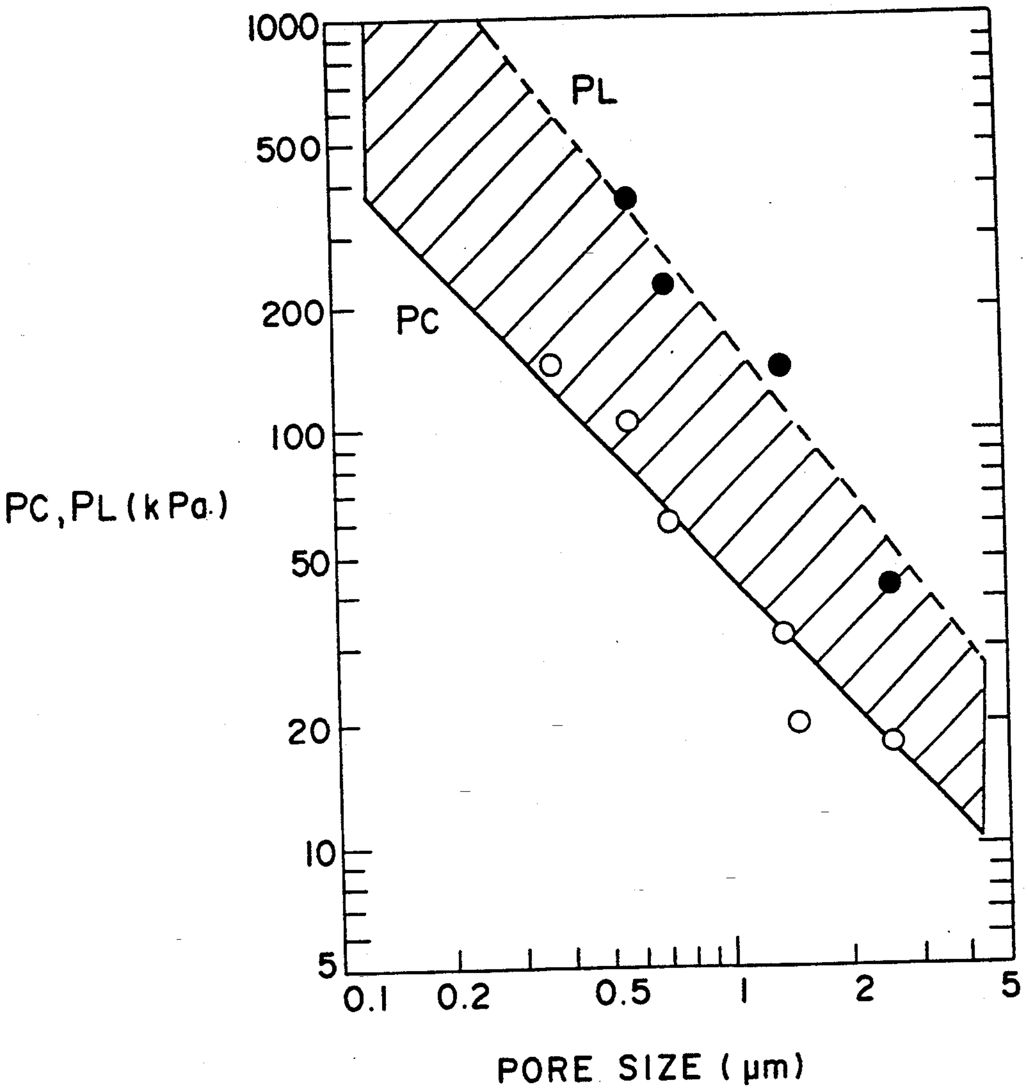
FIG. 9 shows the results obtained in Example 1C.

C. Using various porous glass membranes differing in pore size and proceeding under the same conditions as mentioned above under A, the critical pressure $P_c$ and the upper limit pressure $P_L$ at which the membrane is wetted with the dispersed phase-forming liquid and begins to give a polydisperse emulsion were determined. The results are shown in FIG. 9. It has thus been established that only when the ΔP is selected within the pressure range between the two lines shown in the figure, monodisperse emulsions can be obtained. From the results shown in FIG. 9, it is apparent that the upper limit pressure $P_L$ is about 5 times the critical pressure $P_c$.

EXAMPLE 2

Production of o/w type emulsions II

A. Using the same emulsification apparatus as used in Example 1, o/w type emulsions were prepared. The porous glass membrane had a pore size of 0.52 μm, the pressure ΔP was 150 kPa, and the following emulsifiers were used.

(a) SDS (anionic): 0.2% by weight, (b) Sodium n-dodecylbenzenesulfonate (anionic): 0.2% by weight, (c) Cetyltrimethylammonium bromide (cationic): 0.5% by weight, and (d) Polyoxyethylene(20)sorbitan monolaurate (nonionic; tradename "Tween 20"): 1% by weight.

Figure 10:
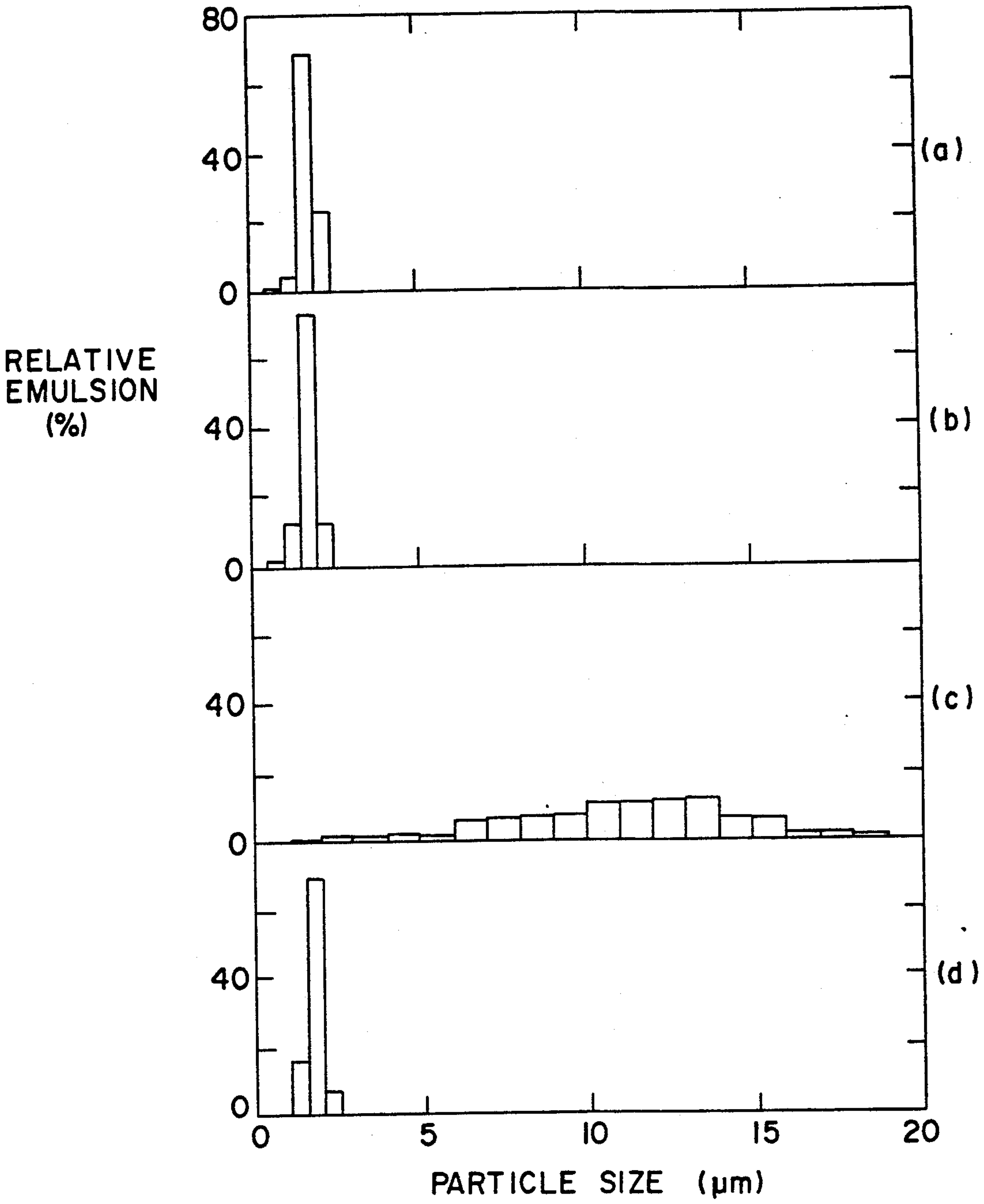
FIG. 10 shows the relation between emulsion particle size and relative emulsion particle volume for each surfactant employed.

For each surfactant, the relation between emulsion particle size and relative emulsion particle volume is shown in FIG. 10.

As is evident from the results shown in FIG. 10, the use of the cationic surfactant (c) resulted in a polydisperse emulsion as a result of wetting of the porous glass membrane with the dispersed phase kerosene but, when the other surfactants were used, monodisperse emulsions were formed and the mean particle sizes and particle size dispersion coefficients thereof were within the respective ranges according to the invention.

Then, for examining the relation between the porous glass membrane surface and the particle size distribution in the o/w type emulsion, o/w type emulsions were prepared using the porous glass membranes mentioned below. SDS was used as the surfactant and the porous glass membrane pore size and the pressure were the same as mentioned above under A.

(e) No surface treatment.

(f) The porous glass membrane was treated with benzyltrichlorosilane and $SO_3$ for the introduction of negatively charged groups.

(g) The porous glass membrane was treated with 2-aminoethylaminopropyltriethoxysilane for the introduction of positively charged groups.

Figure 11:
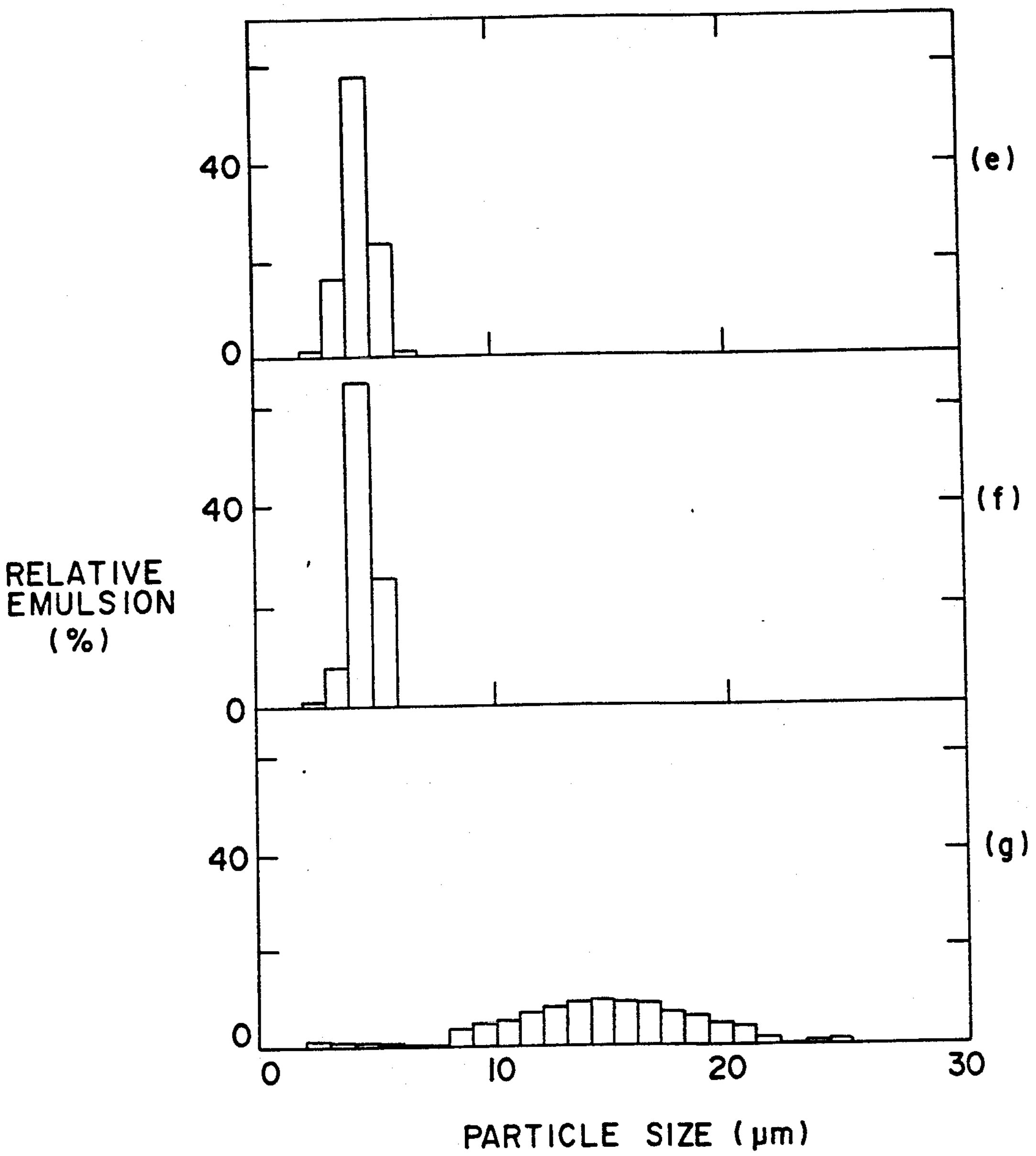
FIG. 11 shows the relation between emulsion particle size and relative emulsion particle volume for the case in which each porous glass membrane was used.

The relation between emulsion particle size and relative emulsion particle volume for the case in which each porous glass membrane was used is shown in FIG. 11.

As is evident from the results shown in FIG. 11, the use of the porous glass membrane (g) having positively charged groups introduced therein gave a polydisperse emulsion owing to wetting of the porous glass membrane with the dispersed phase kerosene whereas, in the other cases, monodisperse emulsions were formed and the mean particle sizes and particle size dispersion coefficients were all within the respective ranges according to the invention.

As is clear from the results shown in FIG. 10 and FIG. 11, it is necessary, for preparing monodisperse o/w type emulsions, that the sign (plus or minus) of the electric charge on the porous glass membrane surface be the same as that of the charge of the surfactant. In case both charges differ each other, the surfactant is adsorbed on the porous glass membrane surface, rendering the membrane surface lipophilic, and, as a result, the porous glass membrane surface is wetted with the dispersed phase-forming liquid, so that any monodisperse emulsion cannot be formed. In the case of nonionic surfactants, monodisperse emulsions are formed presumably because they are negatively polarized in the continuous phase liquid (aqueous phase). B. Monodisperse emulsions were prepared in the same manner as mentioned above under A except that porous glass membranes having a pore size of 0.52 μm or 1.36 μm were used and that the concentration of the surfactant (SDS) in the continuous phase liquid was varied.

Figure 12:
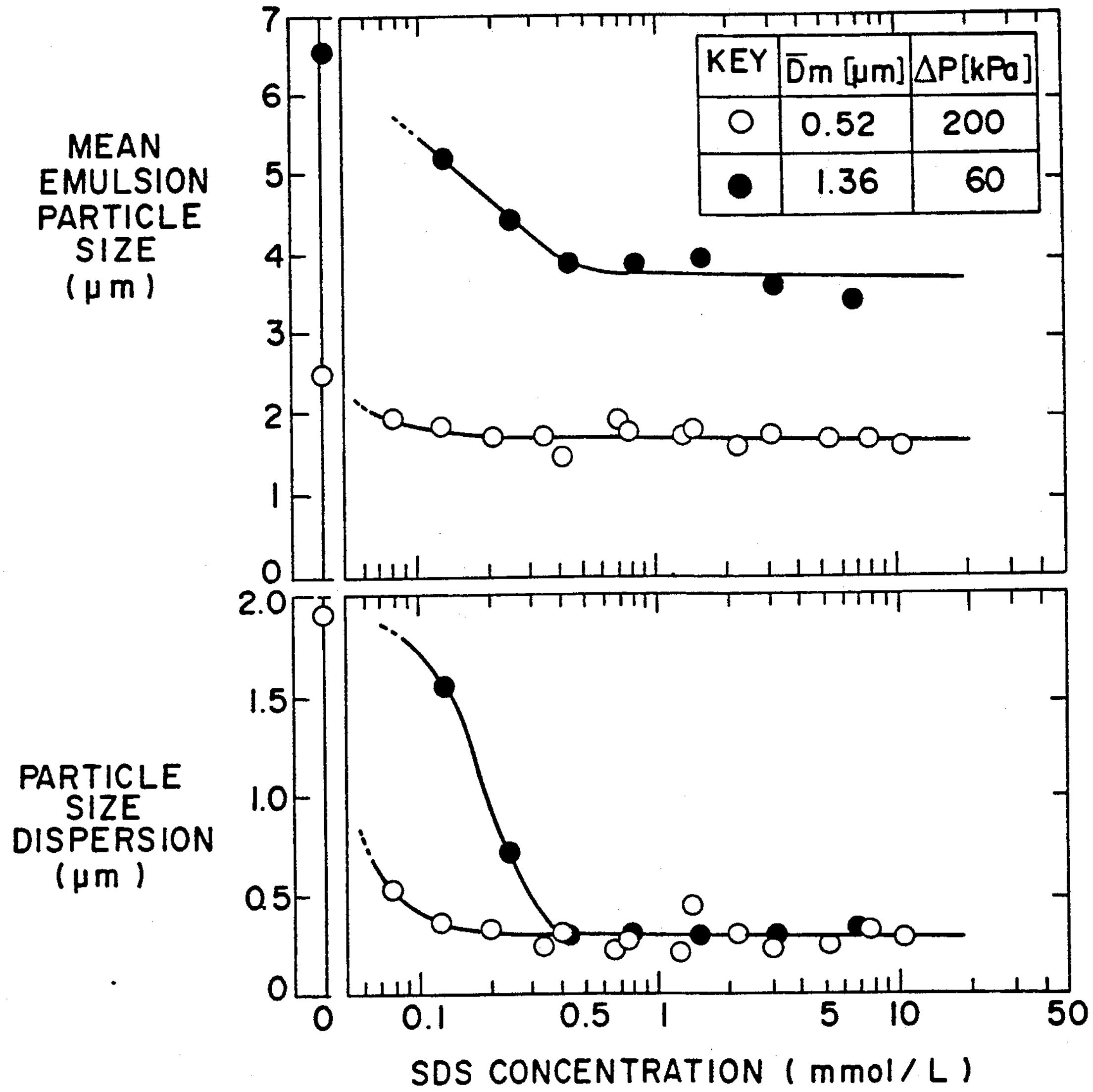
FIG. 12 shows the influence of the surfactant (SDS) concentration on the mean emulsion particle size and particle size dispersion coefficient as determined using a centrifugal sedimentation type particle size distribution measuring apparatus.

The influence of the surfactant (SDS) concentration on the mean emulsion particle size and particle size dispersion coefficient as determined using a centrifugal sedimentation type particle size distribution measuring apparatus is shown in FIG. 12. In FIG. 12, the surfactant (SDS) concentration is the equilibrium concentration in continuous phase. While the critical micelle concentration (CMC) of SDS is about 7 mmol/liter, the method of the invention could give monodisperse emulsions even at very low SDS concentrations of 0.2 to 0.4 mmol/liter (dilute concentrations of about 1/30 to 1/10 of CMC), as is evident from FIG. 12. However, further reduction in SDS concentration resulted in increases in mean emulsion particle size and particle size dispersion coefficient, with substantial dispersion in particle size. The greater the porous glass membrane pore size is, the more remarkable the dispersion in particle size distribution is. In other words, the production of monodisperse emulsions by the membrane emulsification method can generally be carried out more stably when the pore size of the porous glass membrane is smaller.

EXAMPLE 3

Production of w/o emulsions

A. A cylindrical porous glass membrane (250 mm in length ×9 mm in inside diameter×0.5 mm in thickness; pore size 2.56 μm) was immersed in a 5% aqueous solution of a silicone resin (tradename "KP-18C"; Shin-Etsu Chemical Co., Ltd.), then deaerated under reduced pressure for 30 minutes, and dried at 100° C. for 2 hours, whereby the surface of the membrane was rendered hydrophobic. The obtained hydrophobic cylindrical porous glass membrane was fixed mounted on the module shown in FIG. 5. The module was attached to the emulsification apparatus shown in FIG. 4 and a w/o type emulsion was produced.

A 1% (by weight) aqueous solution of sodium chloride was used as the dispersed phase-forming liquid, and kerosene containing sorbitan monooleate in a concentration of 0.1% by weight as the continuous phase liquid. In preparing the w/o type emulsion, the dispersed phase-forming liquid was forced into the continuous phase liquid at a pressure of 25 kPa.

The w/o type emulsion obtained had a mean emulsion particle size of 8.2 μm and a coefficient of particle size dispersion of 0.27.

Figure 13:
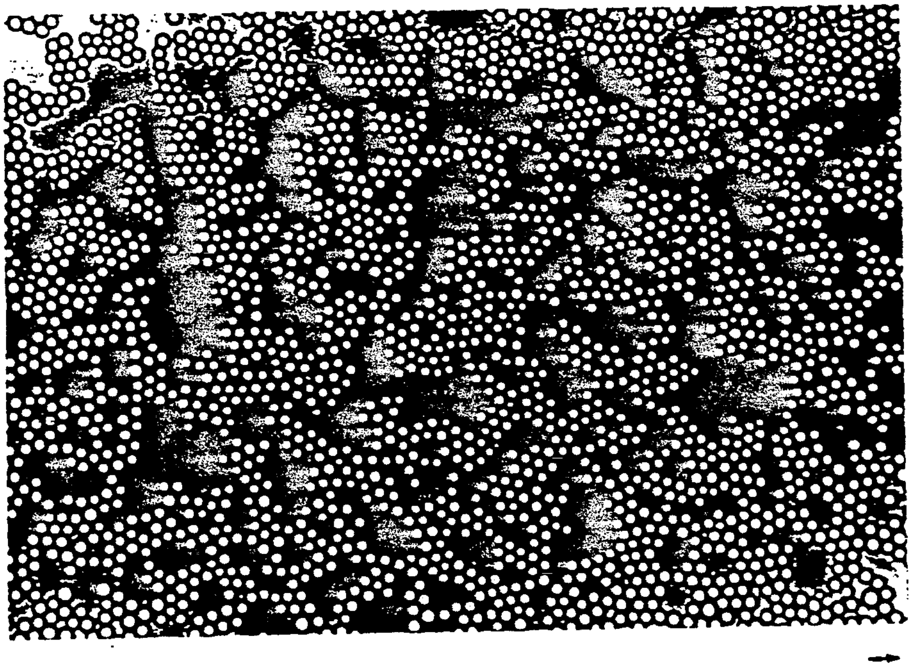
FIG. 13 is an optical photomicrograph of the emulsion obtained in Example 3.

An optical photomicrograph of the emulsion obtained is shown in FIG. 13. In the figure, the scale shown corresponds to 20 μm. It is clear that the w/o type emulsion provided by the invention is very uniform in particle size and is monodisperse.

B. A w/o type emulsion was produced in the same manner as mentioned above under A except that kerosene containing sorbitan monooleate in a concentration of 0.5% by weight was used as the continuous phase liquid.

This w/o type emulsion, too, had substantially the same mean particle size and particle size dispersion coefficient as those of the emulsion obtained as mentioned above under A and was monodisperse.

EXAMPLE 4

Production of w/o/w type emulsions

A. A cylindrical porous glass membrane (250 mm in length ×9 mm in inside diameter×0.36 mm in thickness; pore size 0.36 μm) was dried under vacuum at 200° C. for 48 hours, then immersed in a 5% solution of octadecyltrichlorosilane in toluene and heated under reflux at 110° C. for 8 hours. Then, the membrane was immersed in a 1% solution of trimethylchlorosilane in toluene at room temperature for 2 hours and then washed thoroughly with anhydrous toluene to give a hydrophobic cylindrical porous glass membrane.

Using the hydrophobic cylindrical porous glass membrane obtained and following the same procedure as used in Example 3, a dispersed phase-forming liquid was forced into a continuous phase by applying a pressure of 300 kPa to said liquid, to give a monodisperse w/o type emulsion with an emulsion particle size of about 1 μm. An aqueous solution containing 0.4% by weight of disodium hydrogen phosphate and 0.1% by weight of potassium dihydrogen phosphate was used as the dispersed phase-forming liquid, and soybean oil containing polyglycerol-condensed ricinoleate in a concentration of 1% by weight as the continuous phase.

B. Then, using a hydrophilic porous glass membrane having a pore size (2.8 μm) at least 1.5 times the maximum emulsion particle size in the monodisperse w/o type emulsion obtained as mentioned above, said monodisperse w/o type emulsion, whose internal phase concentration was (a) 1% or (b) 50% and which was to serve as a disperse phase-forming liquid, was forced into an aqueous solution (continuous phase liquid) containing 1% by weight of polyoxyethylene(20)sorbitan monolaurate (nonionic surfactant; tradename "Tween 20") and 1% by weight of sodium chloride through said membrane at a pressure of 40 kPa, whereby a w/o/w type emulsion was obtained.

Figure 14:
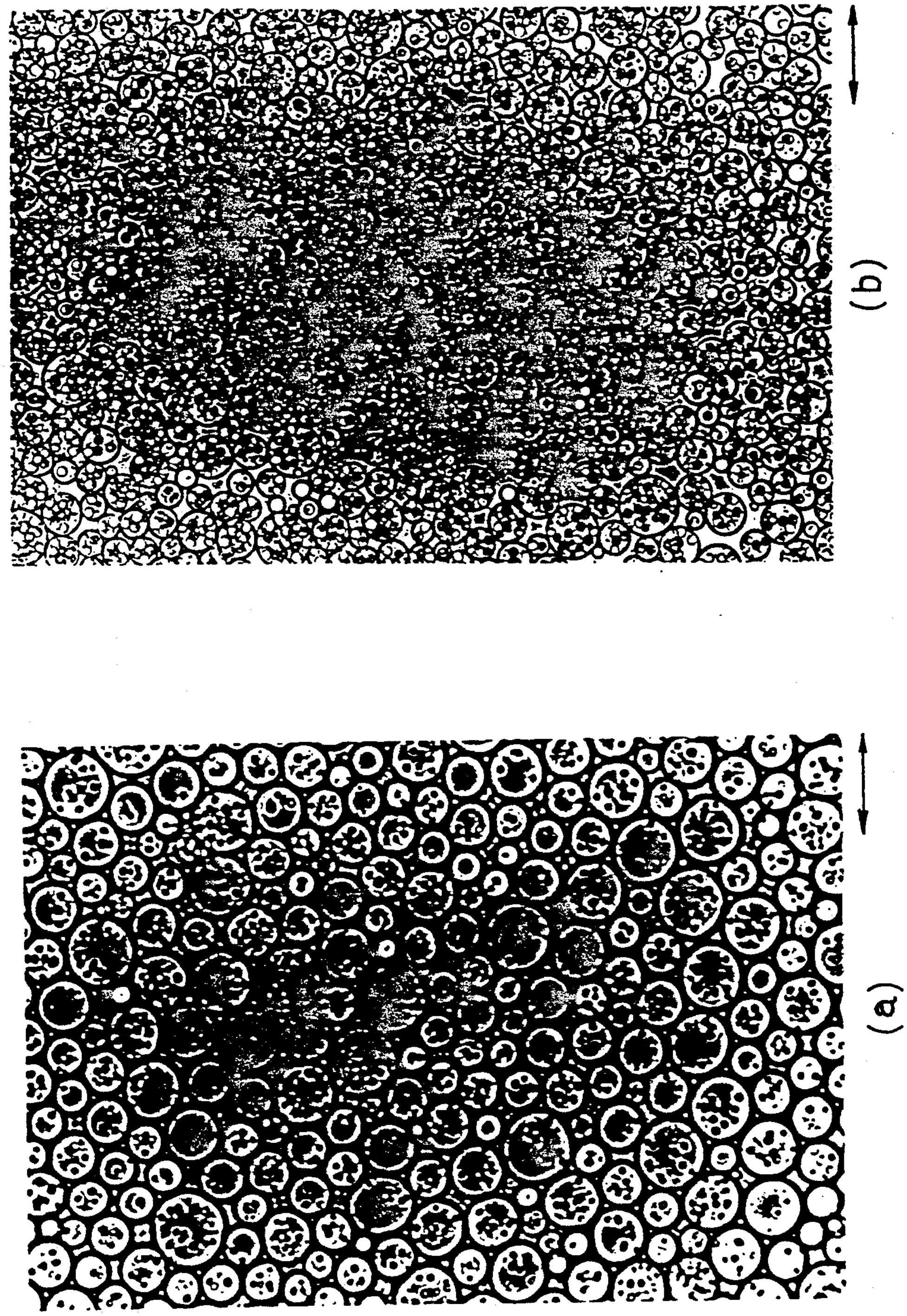
FIG. 14 shows optical photomicrographs of w/o/w emulsions obtained by the invention.

Optical photomicrographs of the two w/o/w type emulsions obtained are shown in FIGS. 14 (*a*) and (*b*), respectively. In the figure, the scale shown corresponds to 20 μm.

From FIGS. 14 (*a*) and (*b*), it is evident that the w/o/w type emulsions of the invention are uniform in emulsion particle size and that the internal phase concentration can be controlled within the wide range of about 1% to about 50%.

REFERENCE EXAMPLE 1

Using the same porous glass membrane as used in Example 1 having a pore size of 0.56 μm, the state of charging in water (zeta potential) was examined at various pH levels. The results are as shown in FIG. 15.

Figure 15:
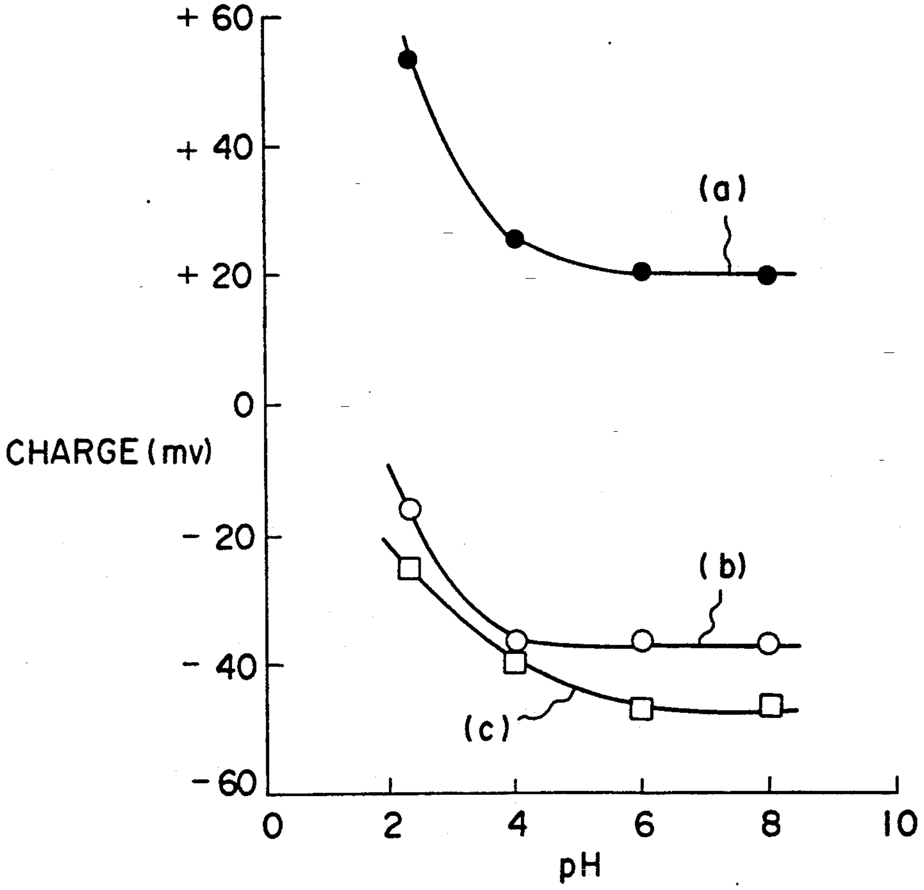
FIG. 15 shows the results obtained in Reference Example 1.

In FIG. 15, the curves shown indicate the results obtained in the following surface states.

(a) Treated with 2-aminoethylaminopropyltriethoxysilane.

(b) No surface treatment.

(c) Treated with benzyltrichlorosilane and $SO_3$.

As is evident from the results shogun in FIG. 15, the untreated hydrophilic porous glass membrane had a negative charge of −15 to −35 mV within the pH range of 2 to 8 [cf. curve (b)].

On the other hand, the hydrophilic porous glass membrane treated with benzyltrichlorosilane and $SO_3$ had a stronger negative charge of −20 to −50 mV [cf. curve (c)].

On the contrary, the hydrophilic porous glass membrane treated with 2-aminoethylaminopropyltriethoxysilane showed a positive charge of +20 to +55 mV [cf. curve (a)].

From these results, it is evident that the surface characteristic of the porous glass membrane can be varied in accordance with the invention.

We claim:

1. A method of producing an o/w type monodisperse single emulsion which comprises introducing under pressure a dispersed phase-forming oily liquid into an aqueous continuous phase liquid containing a cationic surfactant through a hydrophilic porous glass membrane positively charged by surface treatment and having pores uniform in size at a pressure 1 to 10 times the critical pressure.

2. A method of producing an o/w type monodisperse single emulsion which comprises introducing under pressure a dispersed phase-forming oily liquid into an aqueous continuous phase liquid containing an anionic surfactant and/or a nonionic surfactant through a hydrophilic porous glass membrane negatively charged by surface treatment and having pores uniform in size at a pressure 1 to 10 times the critical pressure.

3. A method of producing an o/w type monodisperse single emulsion which comprises introducing under pressure a dispersed phase-forming oily liquid containing an oil-soluble surfactant into a continuous phase aqueous liquid containing a cationic surfactant through a hydrophilic porous glass membrane positively charged by surface treatment and having pores uniform in size at a pressure 1 to 10 times the critical pressure.

4. A method of producing an o/w type monodisperse single emulsion which comprises introducing under pressure a dispersed phase-forming oily liquid containing an oil-soluble surfactant into a continuous phase aqueous liquid containing an anionic surfactant and/or a nonionic surfactant and/or a dispersion stabilizer through a hydrophilic porous glass membrane negatively charged by surface treatment and having pores uniform in size at a pressure 1 to 10 times the critical pressure.

5. A method of producing a w/o type monodisperse single emulsion which comprises introducing under pressure a dispersed phase-forming aqueous liquid into an oily continuous phase liquid containing an oil-soluble surfactant through a porous glass membrane rendered hydrophobic by surface treatment and having pores uniform in size at a pressure 1 to 10 times the critical pressure.

* * * * *